United States Patent [19]

Christine

[11] Patent Number: 4,630,429

[45] Date of Patent: Dec. 23, 1986

[54] APPARATUS AND METHOD FOR SEALING A WEB OF FILM IN A FORM, FILL, AND SEAL PACKAGING SYSTEM

[75] Inventor: William C. Christine, Catasauqua, Pa.

[73] Assignee: Baxter Travenol Laboratories, Inc., Deerfield, Ill.

[21] Appl. No.: 697,556

[22] Filed: Feb. 1, 1985

[51] Int. Cl.[4] ............................................. B65B 9/00
[52] U.S. Cl. ...................................... 53/479; 53/373; 53/451; 53/551; 156/515
[58] Field of Search ................. 53/373, 388, 451, 477, 53/479, 550, 551, 552, 553, 555; 156/456, 515, 583.1, 583.4, 583.7; 219/243, 245, 258

[56] References Cited

U.S. PATENT DOCUMENTS

| 2,244,550 | 6/1941 | Chandler | 156/515 |
|---|---|---|---|
| 2,762,420 | 9/1956 | Stanton | 156/583.1 |
| 2,928,220 | 3/1960 | Kannengeisser | 53/373 |
| 3,574,038 | 4/1971 | Wolfe | 156/515 |
| 3,574,039 | 4/1971 | Fehr et al. | 156/515 |
| 3,692,613 | 9/1972 | Pederson | 53/552 |
| 3,965,653 | 6/1976 | Lerner | 53/373 |
| 4,062,718 | 12/1977 | Hay, II | 53/373 |
| 4,288,968 | 9/1981 | Seko et al. | 53/373 |
| 4,444,613 | 4/1984 | Burmeister | 156/456 |
| 4,512,138 | 4/1985 | Greenawalt | 53/373 |

Primary Examiner—John Sipos
Assistant Examiner—Donald R. Studebaker
Attorney, Agent, or Firm—John P. Kirby, Jr.; Paul C. Flattery; Robert M. Barrett

[57] ABSTRACT

An apparatus and method for creating the transverse seals in a form, fill and seal packaging machine is provided. The apparatus includes a heating member that heats a portion of the web of film to create the transverse seals, and a cooling member that cools the heated portion of the web of film and the heating member. The heating member includes a hot bar, a heater for heating the hot bar, and a biasing member that disengages the hot bar from the heater before the hot bar contacts the web of film.

46 Claims, 8 Drawing Figures

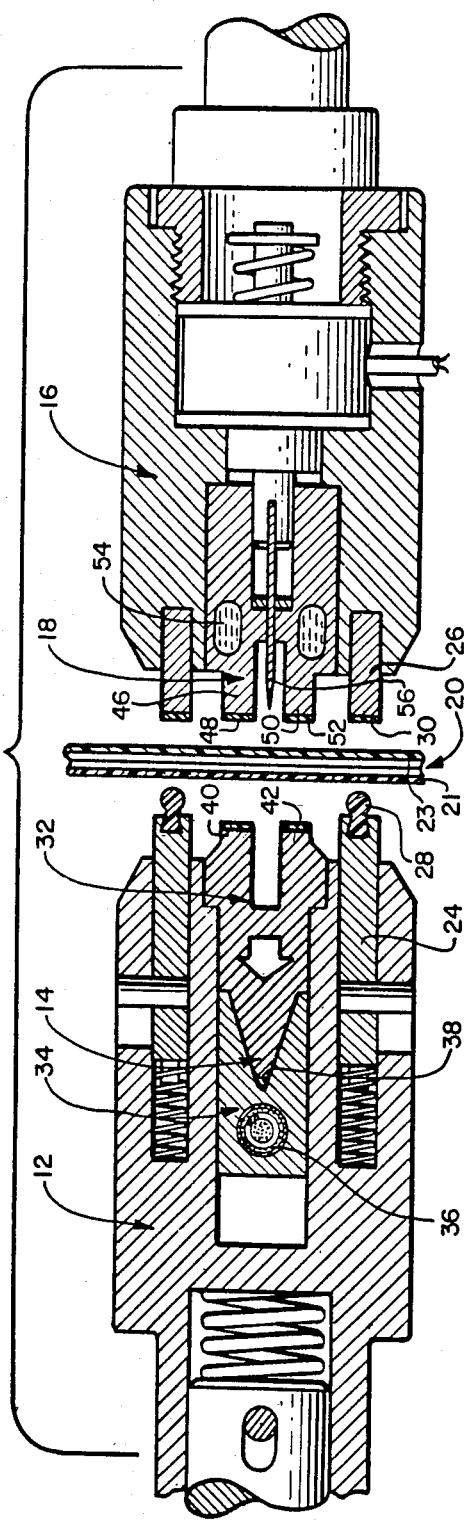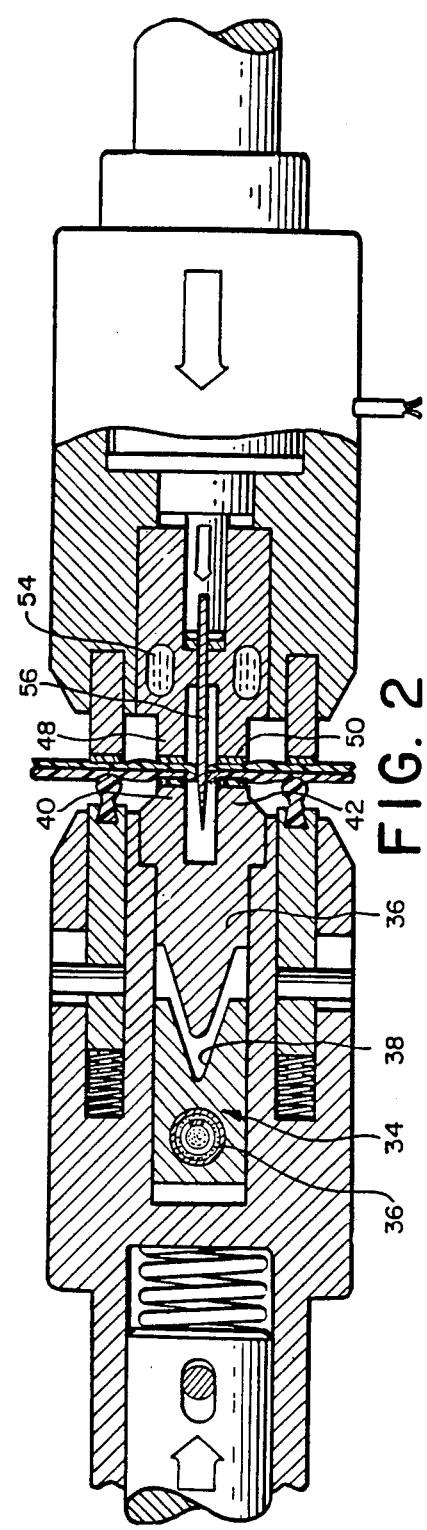

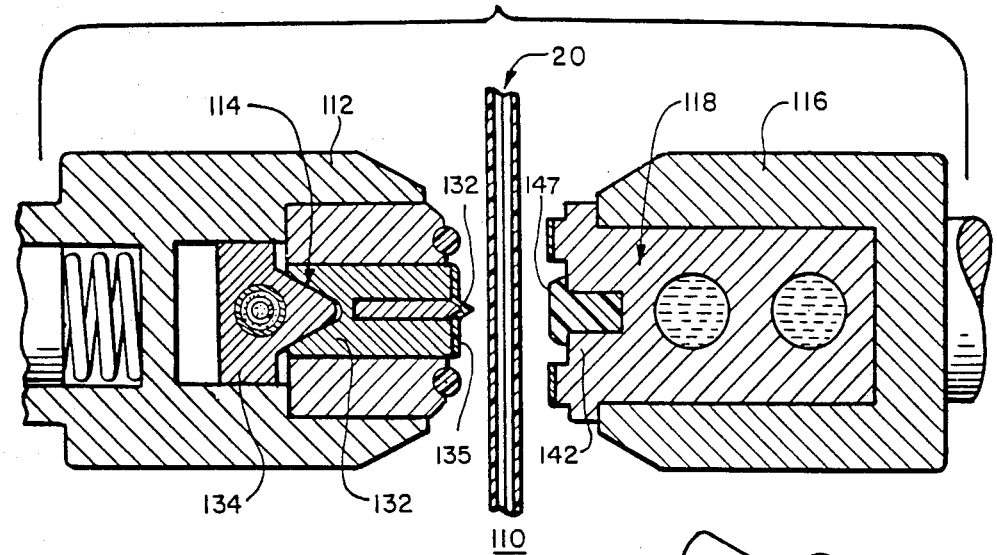
FIG. 5
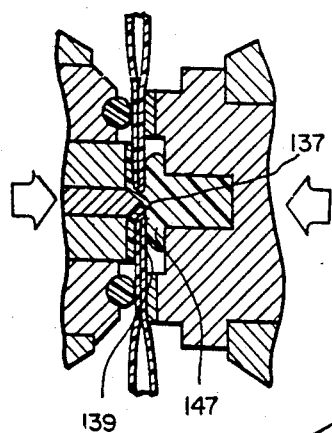
FIG. 6
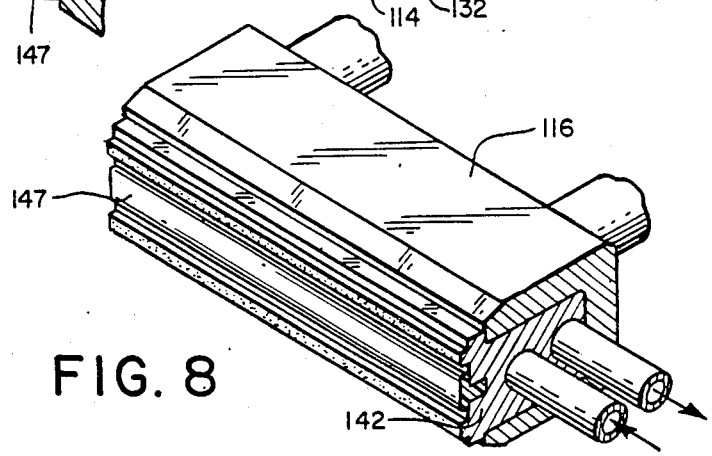
FIG. 7
FIG. 8

APPARATUS AND METHOD FOR SEALING A WEB OF FILM IN A FORM, FILL, AND SEAL PACKAGING SYSTEM

BACKGROUND OF THE INVENTION

This invention relates to an apparatus and method for sealing two layers of a web of plastic material together. In particular, the present invention relates to an apparatus and method for forming the transverse seals in a web of film in a form, fill, and seal packaging machine.

Typically, form, fill, and seal packaging machines are utilized to package a product in flexible containers. To this end, form, fill, and seal packaging machines are utilized to seal pharmaceuticals, dairy products, wine, food stuffs, cosmetics and other products in flexible containers. The form, fill, and seal packaging machine provides an apparatus for packaging these products in an expedient manner.

In one type of form, fill, and seal packaging machine, a web of heat-sealable film is passed over a former or mandrel that forms the film into a tubular shape. To effect the tubular shape, the film is folded longitudinally and heat sealed along abutting longitudinal edges. The tubular shaped film is then passed around a tubular fill system that deposits the product to be packaged into the tubular shaped film. To create individual packages (hereinafter "bags") the web of film must be sealed across its width. These "transverse seals" function as a seal to form a pouch in the web of film for receiving the material to be packaged, and seal the filled end of a previously filled pouch. After the transverse seals are created, the web may then be severed into an individual bag.

The two usual methods of creating the transverse seals in a web of film are impulse sealing and constant hot bar sealing. Impulse sealing is a technique through which the energy required to heat seal the film together is delivered electrically in precisely measured pulsed charges. Usually, the measured electrical charge is pulsed through a ribbon of resistant metallic material for a predetermined time while the two layers of film are clamped together by jaws in intimate juxtaposition. The energy of the impulse sealer causes the film to soften and bond together. After the film is melted together, it must be cooled to a crystalline condition before the jaws may be opened or the film may separate.

Although the impulse system is effective for creating the transverse seals in a web of film, it requires a great deal of maintenance and utilizes certain consumable components. Accordingly, the production process must be periodically interrupted so that the consumable components may be replaced. One such consumable component is the ribbon element which has a relatively short life and must be replaced at regular intervals. The ribbon elements also include covers—the covers ensure that the melted film does not adhere to the ribbon element—that also have a relatively short life and must be constantly replaced.

In a production machine, replacing and changing these consumable elements can be a costly nuisance. Moreover, interruption of the form, fill, and seal procedure for routine maintenance is especially costly and time consuming in the case of an aseptic packaging system. Interruption of an aseptic production system not only means production interruption, but also necessitates the time consuming process of resterilization of the work area prior to restarting production.

Another method of creating the transverse seals in a form, fill, and seal packaging machine is to utilize a static or hot bar system. The hot bar system utilizes a sealing bar heated to an appropriate temperature by an electric cartridge heater. The sealing bar is then maintained at this temperature by the cartridge heater. The hot bar system suffers two major drawbacks. Because the sealing bar is constantly heated, it is difficult to precisely control the amount of energy, i.e. BTUs, that flow into the web of film while the layers of the web of film are in intimate contact. This is important because the portions of the film that are melted to create the transverse seals must be subsequently cooled to the point of crystallization before the film may be released and a new set of transverse seals created. Moreover, due to the constant heat, it is not possible to release the web of film, after creating the transverse seals, from the sealing jaws without the addition of some type of consumable or replaceable release element or the use of a slip arrangement.

Other methods of sealing a web of film in a form, fill, and seal packaging machine have been utilized, including ultrasonic welding, heated gas, and radiofrequency welding. While in special situations these techniques may be preferred, these methods of creating transverse seals in a web of film to create bags are expensive and slow.

Thus, there is a need for an apparatus and method for creating transverse seals in a form, fill, and seal packaging machine that overcomes the disadvantages of the prior art.

SUMMARY OF THE INVENTION

The present invention provides a method and apparatus for forming the transverse seals in a web of film in a form, fill, and seal packaging machine. The apparatus includes a heating member that heats a portion of the web of film to create the transverse seals. Located on an opposite side of the web of film is a cooling member that functions to cool the heating member and melted portions of film. The heating member includes a hot bar, with film contact surfaces, and means for heating the hot bar. The cooling member includes a cold bar, with film contact surfaces, and means for cooling the cold bar. The cold bar and hot bar may have corresponding film contact surfaces.

The hot bar and means for heating cooperate so that the hot bar is disengaged from the means for heating when it contacts the film surface. Therefore, the hot bar contains a fixed amount of thermal energy. The hot bar may include channels that are filled with a phase change material.

The hot bar is heated to approximately a temperature equal to the softening point of the film. The cold is maintained at a sufficient temperature so that the number of BTU's loaded into the hot bar will melt the film and then the film will be cooled to a crystallized condition. Preferably the bar is maintained at 50°-80° F.

The method of creating the transverse seals entails heating a portion of the web of film sufficiently so that it melts. The film is then cooled by the cooling means.

The cooling member may include a hydraulically accuated knife.

The hot bar may include a raised projection having a capability of more rapid conductivity than the surrounding heat seal surface. The cold bar may include the opposing resilient pressure pad. The hot bar would sever the web of film and heat seal simultaneously.

Accordingly, an advantage of the present invention is that it provides an apparatus and method for melting a portion of a web of film to seal the web together, and then cooling the web of film so that the film crystallizes at the melted portion.

Another advantage of the present invention is that it provides a heat sealer that melts a portion of the web of film, but is not heated while it is in contact with the web of film.

A further advantage of the present invention is that it provides a cooling member that cools the heat sealer as the heat sealer contacts the web of film.

Still another advantage of the present invention is that it provides a hot bar that has two film contact surfaces and a cold bar that has two film contact surfaces that correspond to the surfaces of the hot bar.

Moreover, an advantage of the present invention is that it provides a cold bar including channels through which a cooling medium may flow.

A still further advantage of the present invention is that the hot bar may simultaneously sever and seal the web of film.

Another advantage of the present invention is that it provides a hot bar that is hollow and contains a phase change material.

A further advantage of the present invention is that it provides a method for introducing a predetermined amount of energy, i.e. BTUs, into a web of film and then removing the energy from the web of film so that the web of film crystallizes.

Moreover, an advantage of the present invention is that it provides a method of heating a web of film with a hot bar, and cooling the hot bar and the heated portion of the web of film to crystallize the film.

A still further advantage of the present invention is that it provides a method of sealing a web of film together utilizing a heat sealer heated to a temperature sufficient so that momentary contact with the film creates a molten condition in the specific polymeric structure being utilized.

Another advantage of the present invention is that it provides a cutting member located between the two surfaces of the cooling means.

A further advantage of the present invention is that it provides a machine for forming the transverse seals in a web of film in a form, fill, and seal packaging machine utilizing heating and cooling means.

Moreover, another advantage of the present invention is that it provides an apparatus for forming the transverse seals in an aseptic form, fill, and seal packaging machine.

Additional features and advantages are described in, and will be apparent from, the Detailed Description of the Presently Preferred Embodiments and from the drawings.

BRIEF DESCRIPTION OF THE DRAWINGS

FIG. 1 illustrates a cross-sectional view of a preferred embodiment of the sealing apparatus of the present invention.

FIG. 2 illustrates a cross-sectional view of the sealing apparatus of FIG. 1 sealing a web of film.

FIG. 5 illustrates a cross-sectional view of another preferred embodiment of the sealing apparatus of the present invention.

FIG. 6 illustrates a cross-sectional view of the sealing apparatus of FIG. 5 sealing a web of film.

FIG. 7 illustrates a top elevational view of the hot bar of the sealing apparatus of FIG. 5.

FIG. 8 illustrates a top elevation view of the cold bar of the sealing apparatus of FIG. 5.

DETAILED DESCRIPTION OF THE PRESENTLY PREFERRED EMBODIMENTS

Figure 3:
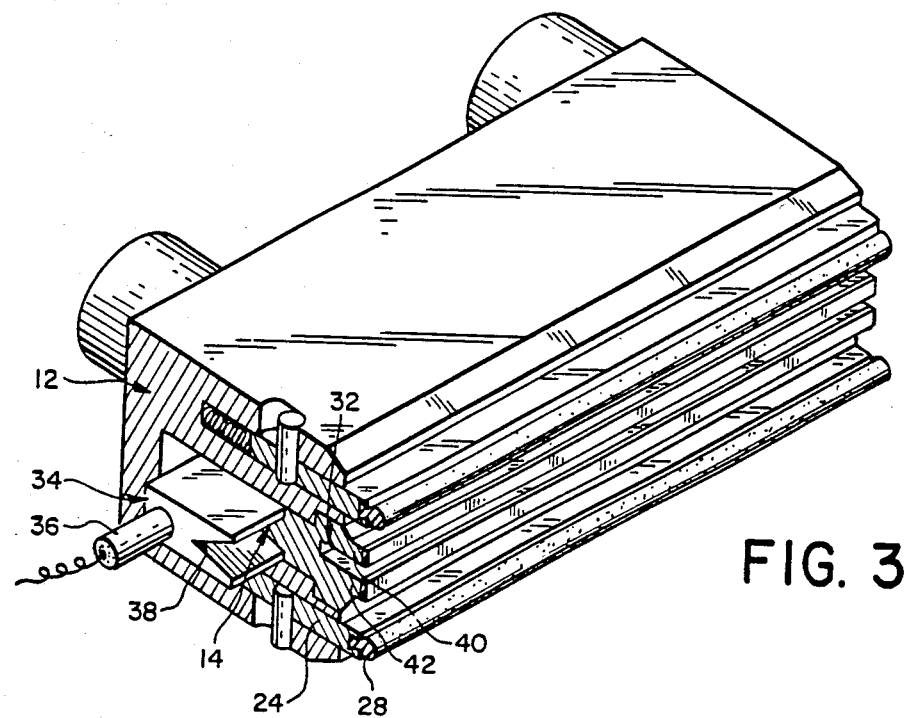
FIG. 3 illustrates a top elevational view of the hot bar of the sealing apparatus of FIG. 1.

Referring to FIG. 1, the sealing apparatus 10 of the present invention is illustrated. The sealing apparatus 10 is specifically designed for use in a form, fill, and seal packaging machine to create the transverse seals in a web of film. The sealing apparatus 10 includes a first jaw 12 that includes a heating member 14 and a second jaw 16 that includes a cooling member 18. As described in detail below, the heating member 14 functions to supply a predetermined amount of heat to a web of film 20, and the cooling member 18 functions to withdraw a predetermined amount of heat from the web of film 20 and the heating member.

As illustrated, the first jaw 12 and the second jaw 16 are located on opposite sides of the web of film 20, diametric each other. The jaws 12 and 16 function to advance the web of film 20 through the sealing stage of the form, fill, and seal packaging machine. To this end, the jaws 12 and 16 are hydraulically accuated and are simultaneously raised and lowered with respect to the web of film 20. An automatic advancement of the film 20 is accomplished by intermittently closing and opening the jaws 12 and 16.

The jaws 12 and 16 include gripper members 24 and 26 respectively. As illustrated in FIG. 2, the gripper members 24 and 26 clamp the film layers 21 and 23 of the web of film 20 into intimate contact. This is essential to prevent slippage of the web of film 20 as the sealing apparatus 10 seals the film layers 21 and 23 together creating the transverse seals. To ensure that the web of film 20 is secured between the jaws 12 and 16, the first gripper member 24 includes an elastomeric bead 28 and the second gripper member 26 has a flat surface 30. The elastomeric bead 28 and flat surface 30 ensure that the web of film 20 is secured between the jaws 12 and 16, while at the same time ensuring that the web of film 20 is not cut or otherwise damaged during the form, fill and seal packaging process.

Referring now to FIG. 3, the heating member 14 is illustrated. The heating member 14 includes a hot bar 32 and a heater bar 34. The hot bar 32 includes two film contact surfaces 40 and 42. If desired, the contact surfaces 40 and 42 may be coated with a release coating to prevent the web of film 20 from sticking to the hot bar 32 after the hot bar has melted a portion of the film. The preferred coating is an alloy of Teflon and ceramic sold under the name Cerami-Pak by A&A Co., Inc., South Plainfield, N.J.

The heater bar 34 is designed to heat the hot bar 32. To this end, the heater bar 34 includes a cartridge heater 36. The cartridge heater may be any cartridge heater known in the art. A Chromolax cartridge heater purchased from Chromolax, Pittsburgh, Pa., has been found to function well in the embodiment of the invention described herein. As illustrated, the hot bar 32 is removably received within a notch portion 38 of the heater bar 34. When so received, the hot bar 32 is heated by the heater bar 34.

As illustrated in FIG. 2, when the jaws 12 and 16 move toward each other, the hot bar 32 disengages the heater bar 34. The hot bar 32 disengages the heater bar 34 due to the movement of the jaw 13. Other biasing means for disengaging the hot bar 32 from the heater bar 34 may be used. Because the hot bar 32 disengages the heater bar 34 before it contacts the web of film 20, a fixed amount of energy, i.e. BTUs, is present in the hot bar. Accordingly, after disengaging the heater bar 34, the hot bar 32 begins to lose heat energy, and therefore, the hot bar 32 begins to cool.

As the hot bar 32, and specifically the film contact surfaces 40 and 42 of the hot bar, contacts the web of film 20, a portion of the web of film 20 is melted further causing the hot bar 32 to lose heat energy. As discussed in detail below, the cooling member 18 is designed to contact a second side of the web of film 20. When the cooling member 18 contacts the web of film 20 it begins to cool the melted portion of the web of film crystallizing the film, and effecting the transverse seals. At the same time, the cooling member 18 also absorbs heat energy from the hot bar 32 cooling the hot bar.

The hot bar 32 is preferably made of a material that has good thermal conductivity. Metallic materials, specifically aluminum and alloys of copper, have been found to possess the required thermal conductivity. It has also been found that the lower the mass of the hot bar 32 the better the heat transfer from the hot bar 32 to the web of film 20 and the cooling member 18. The hot bar 32 must lose heat sufficiently fast to allow the cooling member 18 to increase the hot tack strength of the polymers of the film and initiate the crystallization process of the portion of the web of film 20. Moreover, it is necessary that the hot bar 32 is able to be quickly heated so that the heat lost by the hot bar 32 may be regained during the cycling period of the jaws 12 and 16. Preferably, the hot bar 32 may be heated within less than 50% of the cycle time and preferably within 35 to 40% of the cycle time. Approximately 50% of the cycling time is devoted to advancing the film, during the remaining 50% of the cycling time the hot bar contacts the web of film.

It has been found that if the hot bar 32 is hollow and contains cavities (not illustrated) a hot bar with improved thermal conductivity is created. It has further been found that if these cavities are filled with a material that has a phase change at or near the temperature desired for the hot bar, the thermal conductivity properties of the hot bar 32 will increase. Examples of desired phase change materials are water and mercury. During the phase change of these materials there is a release of a great amount of energy that can melt the web of film 20, at the same time causing a substantial loss of energy and therefore a drop in the temperature to the hot bar 32. Thus, the melting and crystallization of the web of film as well as the reheating of the hot bar 32 may be readily accomplished.

Figure 4:
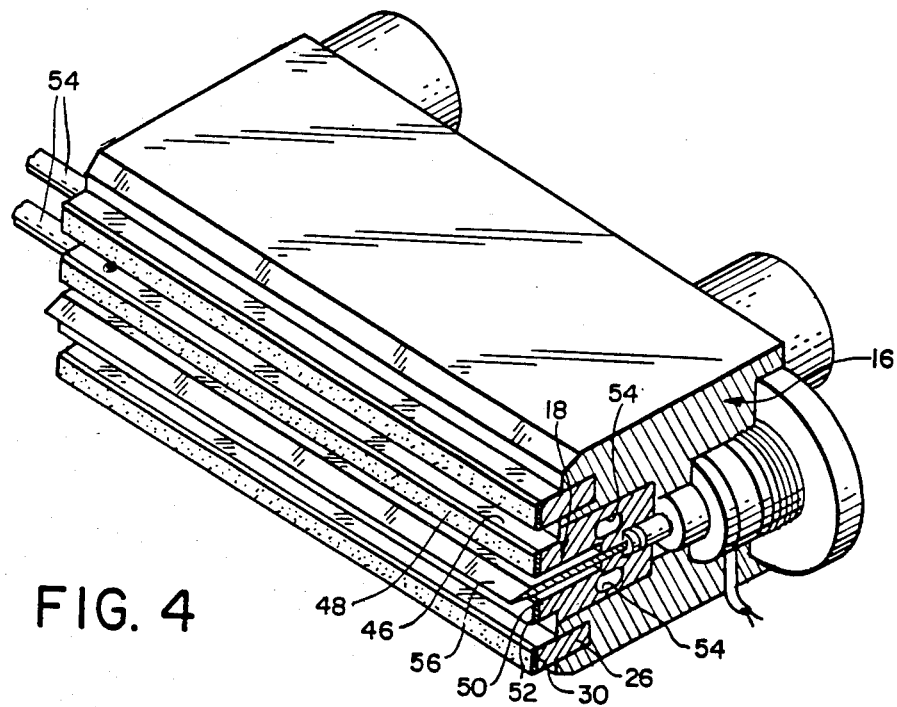
FIG. 4 illustrates a top elevational view of the cold bar of the sealing apparatus of FIG. 1.

Referring now to FIG. 4, the cooling member 18 is illustrated. The cooling member 18 includes a cooling bar 46 having two film contact surfaces 48 and 50. Preferably, the film contact surfaces 48 and 50 correspond to the film contact surfaces 40 and 42 of the hot bar 32.

In the preferred embodiment illustrated, the film contact surfaces 48 and 50 include a resilient face 52. The resilient face may 52 be created from an elastomeric material. The preferred material for the resilient face is a silicon rubber that does not degrade at high temperatures, and is also acceptable to the FDA. The resilient face 52 provides a surface that ensures that the transverse seals are continuous across the web of film 20. Due to unavoidable peculiarities of the film contact surface 40 and 42, if a resilient material 52 is not utilized on the film contact surfaces 48 and 50, it is possible that continuous side seals will not be created across the web of film 20.

The cooling bar 46 includes channels 54. A cooling medium, such as water, is fed through the channels 54 to cool the cooling bar 46. This is especially necessary after the cooling bar 46 has absorbed heat from the web of film 20 and the hot bar 32. Because it is desirable to maintain the cooling bar 46 at approximately ambient conditions, the cooling medium is fed into the channels 54 of the cooling bar 46 at temperatures slightly below ambient conditions. Due to the heat absorbed by the cooling bar 46, the cooling medium exits the cooling bar 46 at approximately ambient temperature.

The cooling bar 46 is preferably constructed from a material with good thermal conductivity. It has been found that a metallic material, specifically, aluminum and stainless steel provide a material with good thermal conductivity.

In the embodiment illustrated in FIGS. 1-4, located between the film contact surfaces 48 and 50 of the cooling bar 46 is a hydraulically operated knife 56. The hydraulically operated knife 56 is utilized to sever the web of film 20 between the transverse seals. The knife 56 is actuated after the cooling bar 46 has cooled the web material 20 at the transverse seals sufficiently to crystallize the seals. It should be noted, that other means besides a hydraulically operated knife 56 may be utilized to sever the film 20 at the transverse seals. One such means is a hot wire (not shown) that may be located on the face of the sealing jaw and heated with impulse energy. Typically, the hot wire is heated with impulse energy to a temperature of approximately 500° F. In use, the transverse seals are created, and the hot wire fires momentarily reaching a temperature 500° F. and severing the web of material between the transverse seals.

A preferred method of operation of the sealing apparatus 10 of this invention is as follows. The jaws 12 and 16 move towards each other pulling a portion of the web of film 20 to the sealing station. As the jaws 12 and 16 grasp the end seams 22 of the web of film 20, the biasing means 44 bias the hot bar 32 away from the heater bar 34. While the heater bar 34 is in contact with hot bar 32, the heater bar is heated to a temperature approximately equal to the softening point of the web of film 20. As the hot bar 32 is biased away from the heater bar 34, the film contact surfaces 40 and 42 of the hot bar contact the surface of the first layer 21 of the web of film 20. The film contact surfaces 40 and 42 cause the film layers 19 and 21 of the web of film 20 to melt. As the layers 19 and 21 of the web of film 20 being the melt, they begin to stick to each other. This hot tack assists the layers of films 19 and 21 to be sealed together.

Simultaneously, as the web film 20 is melted, the cooling bar 46, and specifically film contact surfaces 48 and 50, contact the second layer 19 of the film 20 and begin to withdraw heat from the web of film 20 and the hot bar 32. This withdrawal of heat from the web of film 20 initiates crystallization of the web of film and creation of the transverse seals.

After the transverse seals have been created, the jaws 12 and 16 are urged away from each other causing the cooling bar 46 to retract and the hot bar 32 to be received by the heating means 34. Once received by the heating means 34, the hot bar 32 is again heated to a temperature approximately equal to the melting point of the web of film. At the same time, the cooling bar 46, which has been heated by the hot bar, is cooled by the cooling medium to a temperature of approximately 50° to 80°. The jaws 12 and 16 and thereby the sealing apparatus 10 may now recycle and create a second set of transverse seals.

Referring now to FIGS. 4-8, another embodiment of the sealing apparatus 110 of this invention is illustrated.

The sealing apparatus 110 includes a first jaw 112 that includes a heating member 114 and a second jaw 116 that includes a cooling member 118. The heating member 114 functions to supply a predetermined amount of heat to the web of film 20, and the cooling member 118 functions to withdraw a predetermined amount of heat from the web of film 20 and the heating member.

Referring specifically to FIG. 7, the heating member 114 is illustrated. The heating member includes a hot bar 132 and a heater bar 134. The hot bar 132 includes a face 135 that has a raised projection 137 and body 141. Preferably, the body 141 and face 135 are created from dissimilar heat conductive materials.

The raised projection 137 has a capability of more rapid conductivity than the surrounding surfaces 137 of the face 135. Accordingly, as illustrated in FIG. 6, when the hot bar 132 contacts the film 20, the projection 137 severs the web of film while the surrounding surfaces 139 create the transverse seals. Severing of the film is effected because of the greater conductivity of the projection 137 and because there is more pressure exerted at the contact point of the projection.

As the jaws 112 and 116 move towards each other, the hot bar 132 is biased away from the heater bar 134. Accordingly, after the hot bar 132 is biased away from the heater bar 134 it begins to lose heat.

Referring to FIG. 8, the cooling member 118 is illustrated. The cooling member includes a cooling bar 142. The cooling bar 142 includes a contoured resilient pressure pad 147 that opposes the projection 137 of the hot bar 132.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An apparatus for sealing at least two plastic layers together comprising:
heating means for melting a portion of each plastic layer to seal a portion of the plastic layers together, the heating means being located in a first of the jaws on one side of the plastic layers and including a hot bar and means for heating the hot bar;
cooling means for absorbing heat from the hot bar and melted portions of the plastic layers to cool the hot bar and melted portions, the cooling means being located in a second of the jaws on a second side of the plastic layers and including a cold bar and means for cooling the cold bar; and
the heating means and cooling means cooperating so that as the hot bar heats the web of film the cold bar cools the film and hot bar.

2. The apparatus of claim 1 wherein the heating means includes means for disengaging the hot bar from the means for heating the hot bar before the hot bar contacts the plastic layers.

3. The apparatus of claim 1 wherein the cold bar has surfaces corresponding to surfaces of the hot bar.

4. The apparatus of claim 3 wherein the cooling means includes means for cutting the plastic layers after a seal is created.

5. The apparatus of claim 2 wherein the heating means includes means for severing the plastic layers.

6. In a machine for manufacturing from a web of film a closed flexible bag having transverse seals an apparatus for creating the transverse seals comprising:
heating means, including a hot bar with at least one film contact surface and means for heating the hot bar, for melting a portion of the web of film to create the transverse seals;
cooling means for cooling the heating means and the melted portion of the web of film, the cooling means being located diametric the heating means and including a cold bar with at least one film contact surface and means for cooling the cold bar;
a pair of jaws, the heating means being located in a first of the jaws and the cooling means being located in a second of the jaws; and
the heating means includes means for disengaging the means for heating the hot bar from the hot bar as the jaws contact the web of film.

7. The apparatus of claim 1 wherein the first jaw includes means for cooperating with the means for disengaging the hot bar from the means for heating the hot bar.

8. The apparatus of claim 6 wherein the cold bar is maintained at temperature of approximately 50° to 80°.

9. The apparatus of claim 6 wherein the film contact surface of the hot bar and cold bar are coated with a film release agent.

10. The apparatus of claim 6 wherein:
the hot bar includes two film contact surfaces;
the cold bar includes two corresponding film contact surfaces; and
the cooling means includes means for severing the web of film between the transverse seals, the means for severing being located between the two film contact surfaces of the cold bar.

11. The apparatus of claim 6 wherein the means for cooling the cold bar includes a cooling medium that flows through channels in the cold bar.

12. The apparatus of claim 6 wherein the hot bar includes means for severing the web of film between the transverse seals.

13. The apparatus of claim 12 wherein the means for cutting includes a projection extending from a face of the hot bar.

14. The apparatus of claim 6 wherein the hot bar includes a notch and the heating means includes a member that is received within the notch when the heating means heats the hot bar.

15. In a form, fill, and seal packaging machine an apparatus for contemporaneously forming transverse seals in a web of film comprising:
heating means for melting and thereby sealing a portion of the web of film to create the transverse seals, the heating means being located on one side of the web of film and including a hot bar having a film contact surface, and means for heating the hot bar; and cooling means for cooling the hot bar and the portion of the film melted by the film contact surface of the hot bar as the hot bar melts the film, the cooling means being located on a second side of the web of film diametric the hot bar and including a cold bar, means for cooling the cold bar, and at least one film contact surface.

16. The apparatus of claim 15 wherein:
the hot bar is constructed from a metallic compound; and
the cold bar is constructed from a metallic compound.

17. The apparatus of claim 15 wherein the film contact surface of the hot bar includes a release coating.

18. The apparatus of claim 17 wherein the release coating is an alloy of TEFLON and ceramic.

19. The apparatus of claim 15 wherein the film contact surface of the cold bar includes a resilient coating.

20. The apparatus of claim 19 wherein the resilient coating is an elastomer.

21. The apparatus of claim 15 wherein the means for cooling includes a cooling medium located in channels in the cold bar.

22. The apparatus of claim 21 wherein the hot bar includes a notch portion that receives a portion of the heating means.

23. The apparatus of claim 15 including:
a pair of opposed jaws, one jaw supporting the heating means, and one jaw supporting the cooling means;
accuating means for causing the jaws to move towards the web of film and each other; and
gripper means for holding the film while the seal is being created.

24. The apparatus of claim 23 including means for causing the hot bar to disengage the means for heating the hot bar when the jaws move toward the web of film.

25. The apparatus of claim 24 wherein the hot bar is heated to a temperature approximately equal to the softening temperature of the film.

26. The apparatus of claim 25 wherein the cold bar is maintained at a temperature of approximately 50° to 80°.

27. The apparatus of claim 15 wherein the cooling means includes means for severing the web of film between the transverse seals.

28. The apparatus of claim 15 wherein the heating means includes means for severing the web of film between the transverse seals.

29. In an aseptic form, fill, seal packaging machine an apparatus for creating transverse seals in a web of film comprising:
a pair of opposed jaws located on opposite sides of the web of film;
heating means for melting a portion of the web of film to create the transverse seals, located in one of the jaws, the heating means including a hot bar having a film contact surface, and means for heating the hot bar;
cooling means located in a second one of the pair of jaws for cooling the hot bar and melted portion of the web of film, the cooling means including a cold bar having at least one film contact surface, and means for cooling the cold bar; and means for severing the web of film between the transverse seals.

30. The apparatus of claim 29 including means for disengaging the hot bar from the means for heating the hot bar before the film contact surface of the hot bar contacts the web of film.

31. The apparatus of claim 29 wherein the cold bar and hot bar have corresponding film contact surfaces.

32. The apparatus of claim 31 wherein the cold bar and hot bar each have two film contact surfaces.

33. The apparatus of claim 29 wherein the means for cutting the web of film is located between the film contact surfaces of the cold bar.

34. The apparatus of claim 29 wherein the means for cutting the web of film is a projection extending from the film contact surface of the hot bar.

35. The apparatus of claim 29 wherein the jaws and means for cutting are hydraulically accuated.

36. The apparatus of claim 30 wherein the means for disengaging the hot bar from the means for heating is a spring that urges the hot bar away from the means for heating.

37. The apparatus of claim 29 wherein:
the hot bar is heated to a temperature of approximately equal to the softening point of the film; and
the cold bar is cooled to a temperature of approximately 50° to 80°.

38. A method for creating transverse seals in a web of film in a form, fill, and seal packaging machine including the steps of:
heating a hot bar with heating means;
disengaging the hot bar from the heating means;
heating a portion of the web of film from a first side of the web with the hot bar to create transverse seals; and
cooling the hot bar and melted portion of the web with a cold bar from a second side of the web of film as the film is melted by the hot bar.

39. The method of claim 38 including the steps of:
advancing the web of film after the transverse seals are cooled by the cooling bar;
reheating the hot bar with the heating means; and
separating the hot bar from the heating member before recontacting the web of film.

40. The method of claim 38 including the step of:
allowing only a predetermined amount of thermal energy to be transmitted to the web of film.

41. The method of claim 38 including the step of:
heating the hot bar to a temperature of above the softening point of the film.

42. The method of claim 38 including the step of:
cooling the cooling bar to a temperature of approximately 50° to 80°.

43. An apparatus for sealing at least two plastic layers together comprising:
heating means for melting a portion of each plastic layer to seal a portion of the plastic layers together, the heating means including a raised portion that simultaneously severs the plastic layers and seals a portion of the two layers together; and
cooling means for absorbing heat from the heating means and melted protions of the plastic layers, the cooling means being located on one side of the plastic layers and the heating means being located on a second side of the plastic layers.

44. The apparatus of claim 43 wherein the heating means includes a hot bar and means for heating the hot bar, the hot bar including a face and a raised projection extending from the face.

45. The apparatus of claim 44 including means for biasing the hot bar from the heating means before the hot bar touches the plastic layers.

46. The apparatus of claim 43 wherein the cooling means includes a contured resilient pad that is located diametric the raised projection of the hot bar.

* * * * *